July 3, 1928.

J. E. SMITH ET AL 1,675,869

TIRE RIM CLAMP

Filed April 8, 1926

INVENTORS.
Jarvis E. Smith
Joseph J. Herlbauer
BY
Duell, Anderson &Duell.
ATTORNEYS.

Patented July 3, 1928.

1,675,869

UNITED STATES PATENT OFFICE.

JARVIS E. SMITH AND JOSEPH J. HERLBAUER, OF JAMAICA, NEW YORK.

TIRE-RIM CLAMP.

Application filed April 8, 1926. Serial No. 100,471.

This invention relates to clamps and particularly to clamps adapted to retain automobile tires in place upon a rim.

An object of this invention is to produce a device which will retain the tire securely in place, will facilitate removal of the tire but which is not apt to become lost during tire replacement.

A further object is to produce a device of the character described, which is efficient in operation and simple in construction and economical in operation.

Other objects of the invention will be in part obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawing, in which.

It has been heretofore customary to retain an automobile tire or the tire and a removable rim in place upon a felly by bolts extending through the felly from side to side engaging on one side a clamping member which extends over the edge of the rim or associated parts, the latter being held in place by a nut. In order to change a tire so held in place, the nuts and clamping members are all removed thereby freeing the tire and permitting it to be slipped off in the direction of the axis. When a new tire has been inserted in place, the clamping members are placed in position and the nuts put on. This procedure is not only cumbersome, but also there is danger of losing some of the nuts or clamping members.

In accordance with this invention, the clamping members are so arranged that they may be turned upon the bolt or screw and they are of such shape that when turned in one position they extend over the edge of the rim or an equivalent part to clamp it in place, and when turned about the bolt to another position, they free the rim for removal. The first position mentioned may be termed the obstructing position and it is a position such that when the nut is screwed into place, it will clamp the rim. The second position may be termed the freeing position since it frees the rim from obstruction and thereby permits its removal.

The clamping member is arranged to control its own position as the nut is screwed on or off and this control is such that as the nut is first loosened it is held in the obstructing position until it becomes loose enough to swing free of the rim. Thereupon it is automatically turned by the continued rotation of the nut until it reaches the freeing position. It is desirable that it should now be held in the freeing position and this is accomplished by one or two more back turns of the nut. After the new tire or rim is in place, the turning of the nut to tighten it first carries the clamp forward toward the felly to free it and thereupon rotates it to the obstructing position and holds it in the obstructing position until the nut has been tightened sufficiently to clamp the rim in place.

It will thus be seen that, in accordance with this invention when a wrench is applied to the nut, the clamp without manual manipulation ordinarily backs away from the felly and when the direction of the nut is reversed, it automatically moves to the obstructing position and holds itself there until clamped in place.

Figure 1:
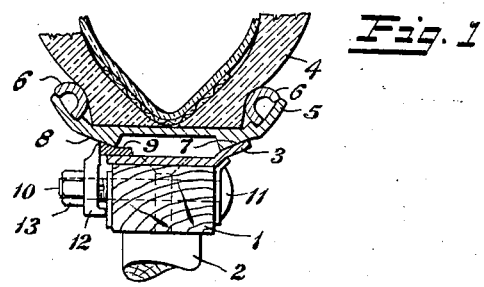
Figure 1 is a cross-section of a portion of a tire and felly showing the clamping device in position.

A convenient manner of accomplishing this result is illustrated in the drawing, in which the numeral 1 designates a felly supported by spokes 2 carrying at its outer side an annular plate 3. The numeral 4 represents a conventional automobile tire held in place within a rim 5 by suitable retaining members 6. On the right side as shown in Fig. 1, the plate 3 and the rim 5 have mating conical surfaces 7 while on the left hand side the rim 5 has a corresponding conical surface 8 adapted to cooperate with an annular wedge member 9 bearing against the plate 3 and the surface 8, so that as member 9 is forced toward the right as shown in Fig. 1, the rim 5 is held tightly in place.

Figure 2:
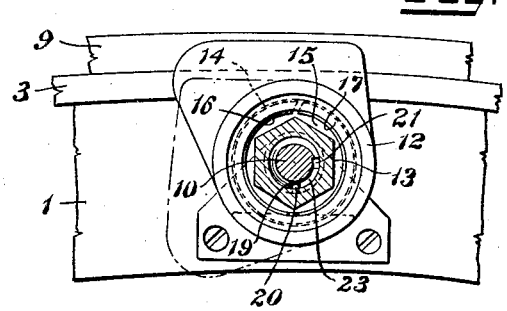
Fig. 2 is an enlarged side view of the clamping member, showing its relation to the parts.

Extending through the felly 1 is a bolt 10 having a head 11 upon one side thereof and carrying at its outer end a clamp 12 and a nut 13. The shape of this clamp is such as shown in Fig. 2 that when in the full line position as seen in that figure, it extends beyond and over the wedge ring 9, while it is capable of being moved to the dotted line position as shown in Fig. 2 to free the ring wedge. Connection is made between the nut 13 and the clamp 12 whereby the rotation of the nut tends to rotate the clamp with it unless otherwise restrained. To this end, the clamp may be hollowed out as shown at 14, Fig. 3, while the nut 13 is provided with a shoulder as shown at 15, the recess 14 being sufficient to receive the shoulder or annular flange 15. On top of the shoulder 15 is placed the split spring washer 16 while the nut, spring washer and clamp may be held in assembled relation by a ring 17 of general L shape section adapted to fit into the recess 14 and extend over the spring washer 16 and the flange 15. Thus it will be seen that the spring washer tends to keep the lower end of the nut 13 in frictional driving contact with the clamp.

Figure 3:
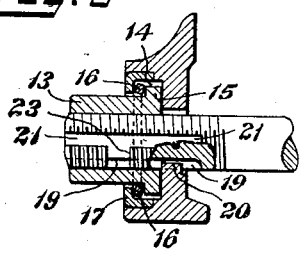
Fig. 3 is a vertical central cross-section of the clamp.
Figure 4:
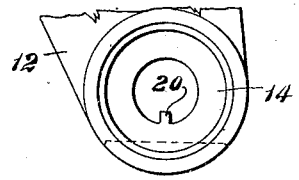
Fig. 4 is a fragmental elevation of the base of the clamp.

With this construction, it will be evident that the rotation of the nut will drive the clamp with it unless the movement of the latter is restrained. Two longitudinally disposed slots or key-ways 19 and 21 may be provided on the bolt 10 extending parallel to its axis and displaced circumferentially. It will be seen that the outer or extreme radially disposed walls of these slots form circumferentially displaced shoulders or lugs upon the bolt or screw member positioned to cooperate with the oppositely disposed shoulders formed by a small key or lug 20 upon the clamp 12 to limit the turning movement of the latter when moving either toward obstructing or freeing positions. Also the inner or adjacent radially disposed walls of these slots provide circumferentially displaced shoulders or lugs cooperating with the opposed shoulders of the lug 20 of the clamp member to prevent turning movement of said clamp member. It is therefore seen that these slots 19 and 21, in effect, from circumferentially displaced shoulders upon the bolt cooperating with the shoulders of the lug 20 upon the clamp to positively lock the latter either in obstructing position or in freeing position. The slot 19 preferably extends from a point adjacent the surface of the felly outwardly toward the end of the bolt a sufficient distance to permit outward movement of the clamp into unclamping position when the lug 20 is positioned in this slot. The other slot or key-way 21 preferably extends from the outer end of the bolt inwardly to a point circumferentially opposite to the slot 19. These two slots are connected by a slot or groove 23, extending circumferentially of the bolt and providing a passageway for the key 20 from one of the axially disposed slots to the other. It will be clear, therefore, that the clamp 12 may pass from its obstructing position, as shown in Fig. 3, in which it is locked in position by engagement of the key or lug 20 with the sides of the slot 19, into freeing position when the lug 20 is positioned in the outer end of the slot 21 to lock the clamp in freeing position. During this passage the clamp moves outwardly toward the end of the bolt until the lug 20 registers with the circumferentially disposed slot 23, when rotation of the clamp to freeing position is permitted by passage of lug 20 through slot 23. This rotation of the clamp brings the lug 20 into alignment with slot 21, thus permitting further outward movement of the clamp as the lug 20 passes outwardly in slot 21. The opposite shoulders of the lug 20 then cooperate with the shoulders or side walls of the slot 21 to positively lock the clamp from turning movement in either direction, thus securing the clamp positively in freeing position.

For conveniences in construction, it may be found desirable to cut both slots 19 and 21 substantially the full length of the active portion of the screw thread, but the inner end of slot 21 beyond the connecting slot 23 and the outer end of slot 19 beyond slot 23 will be inactive. Since the lug may pass through the slots 19, 23 and 21, in either direction, to accomplish the clamp movements described, these slots may be considered as together constituting a single slot having axially disposed circumferentially displaced portions with an intermediate circumferentially disposed connecting portion. Also it will be observed that the lugs provided by the outer end of slot 21 and inner end of slot 19 not only are displaced circumferentially from each other, but they are also displaced longitudinally or axially of the bolt.

In accordance with this construction, it will be clear that starting with the device with the tire firmly in place as shown in Fig. 1, we may rotate the nut 13 backward or counter-clockwise and during this movement the clamp is held in its obstructive position and backs away from the rim without rotation until the key 20 comes opposite the connecting portion 23 of the slots whereupon the friction between the flange 15 of the nut 13 and the clamp 12 is sufficient to rotate the clamp until the key 20 comes into alignment with the keyway or slot 21. The clamp is now in freeing position and further backing off of the nut 13 causes the key 20 to enter the outer portion of the slot 21. This prevents the clamp from falling into obstructive position by accident as the wheel is turned around.

When the tire is in place, the screwing forward of the nut 13 will first advance the clamp in its freeing position toward the felly, the key 20 then passing longitudinally inward in the outer end of the slot 21. When the lug 20 reaches alignment with the circumferential slot 23, the action of the nut 13 rotates the clamp into obstructing position, the lug 20 then passing through the connecting slot 23 into alignment with the inner part of slot 19. The clamp will then be carried forward into tight clamping position against the felly and rim 9, while the lug 20 passes inwardly in slot 19.

It will thus be seen that in a single operation of rotation, the nut automatically loosens the clamp, moves it into freeing position and holds it there. Furthermore, when the nut is turned onto the bolt from clamp releasing position, the clamp is automatically brought into obstructing or rim securing position, and held there through cooperation of the lug 20 in the inner end of slot 19: in other words, the clamp is moved automatically by operation of the nut 13, either into obstructing or freeing positions, and also automatically locked in either of said positions in a similar manner.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. A device of the character described including, in combination, a screw member having a slot thereon with axially extending circumferentially displaced parts, a clamp movable from obstructing position to freeing position, a nut engaging said screw member for tightening said clamp in clamping position, and a lug carried by said clamp and engageable in said circumferentially displaced slot parts for positioning the clamp, respectively, in obstructing position or freeing position.

2. A device of the character described, comprising, in combination, a screw, a clamping member and a nut, means for holding said nut and said clamp in frictional engagement, a slot upon said screw, a key upon said clamp for controlling the position of said clamp, said slot comprising two circumferentially spaced portions parallel to the axis of the screw and a connecting intermediate portion whereby said nut is held in one position while said key is in one of said spaced portions and moves to the other of said spaced portions through the intermediate portion in response to the movement of the nut and engages with the other spaced portion during further movement of the nut.

3. A device of the character described, including, in combination, a screw member, a clamp rotatable from obstructing position to freeing position, a nut engaging said screw member for tightening said clamp in place, a yielding connection between said nut and said clamp for rotating the latter from the former, cooperating shoulders formed respectively upon said screw member and upon said clamp and cooperating to limit clamp rotation in both directions when said clamp is in either obstructing position or in freeing position so as to retain said clamp in either of said positions.

4. A device of the character described including, in combination, a threaded attaching member having a slot opening through the thread thereof, said slot having circumferentially displaced parts and a part connecting said displaced parts, a clamp rotatable from obstructing position to freeing position, a nut engaging said threaded attaching member for tightening said clamp in clamping position, a lug carried by said clamp engaging in said circumferentially displaced slot parts for retaining the clamp respectively in obstructing or in freeing position and engaging in said connecting slot part when the clamp moves from one position to another, and a yielding connection between said nut and said clamp whereby the clamp is automatically moved from one position to another when the nut is rotated.

5. A device of the character described including, in combination, a screw member, a clamp rotatable from obstructing position to freeing position, a nut engaging said screw member for tightening said clamp in clamping position, shoulders cooperating for positively locking the clamp when in freeing position against rotation in either direction from said freeing position, and a yielding connection between said nut and said clamp for rotating the latter so as to bring said shoulders into cooperating locking position when said nut is rotated in clamp releasing direction.

6. A device of the character described, comprising in combination a screw member, a clamp rotatable from obstructing to a freeing position, a nut engaging said screw for tightening said clamp in place, a yielding connection between said nut and said clamp for rotating the latter from the former, retaining mechanism for positively retaining the clamping member in obstructing position when in and adjcent to clamping position, regardless of movement of the nut in either direction, said mechanism being adapted to release said clamp to movement to freeing position after it is completely freed from clamping position, and retaining mechanism for retaining the clamp in freeing position regardless of movement of the nut in either direction for a different part of the travel of the nut.

7. A device of the character described including, in combination, a clamp movable into obstructing position or into freeing position, a securing device for said clamp movable to secure or release the latter, operative connections between said securing device and clamp to automatically move the latter from obstructing to freeing position when said securing device is moved to release said clamp, and positive locking mechanism to positively lock said clamp in freeing position and limiting its movement both toward and away from obstructing position during continued releasing movement or during reverse movement of said clamp securing device, said locking mechanism including cooperating shoulders adapted to be set into cooperating positive locking position by releasing movement of said clamp securing device at a predetermined point in its releasing movement.

8. A device of the character described including, in combination, a clamp movable into obstructing position or into freeing position, a securing device for said clamp including a screw member and a nut movable thereon to secure or release said clamp, operative connections between said securing device and clamp to automatically move the latter from freeing position to obstructing position when said securing device is moved to securing position, and locking mechanism to positively lock said clamp in obstructing position and limiting its movement both toward and away from freeing position during continued tightening movement of said clamp securing device, said locking mechanism including a longitudinally disposed slot formed in said screw member and a cooperating lug upon said clamp movable in said slot, said lock being automatically set in locking position by tightening movement of said clamp securing device at a predetermined point in its tightening movement.

9. A device of the character described including, in combination, a screw member having a slot formed therein with longitudinally extending circumferentially displaced parts and a circumferentially extending part connecting the longitudinally extending parts, a clamp rotatable from obstructing position to freeing position, a lug carried by said clamp and engageable in said slot, a clamping nut engaging said screw member and cooperating to tighten or release said clamp, and means automatically operable by said clamping nut for rotating said clamp from obstructing to freeing position, or vice versa, and moving said lug into engagement with one of said longitudinally extending slot parts, thereby locking said clamp in its respective position.

10. A device of the character described including, in combination, a screw member, a clamp rotatable on said screw member into obstructing position or into freeing position, a nut cooperable with said screw member to secure or release said clamp and cooperating shoulders formed respectively upon said clamp and upon said screw member, cooperating to stop rotation of said clamp in one of its said positions and to retain it in said last mentioned position.

11. A device of the character described including, in combination, a screw member, a clamp rotatable on said screw member into obstructing position or into freeing position, a nut cooperating with said screw member to secure or release said clamp, and cooperating shoulders formed respectively upon said clamp and in circumferentially displaced positions upon said screw member and cooperating to stop rotation of said clamp in either freeing or obstructing position, and to positively retain it in either of said positions.

12. A device of the character described including, in combination, a screw member, a clamp movable into obstructing position or into freeing position, a nut cooperating with said screw member to secure or release said clamp, circumferentially and axially displaced shoulders formed on said screw member, and a lug on said clamp cooperating with said first mentioned shoulders for retaining said clamp either in freeing or in obstructing position.

In testimony whereof we affix our signatures.

JARVIS E. SMITH.
JOSEPH J. HERLBAUER.